United States Patent
Tanaka

(10) Patent No.: US 9,432,539 B2
(45) Date of Patent: Aug. 30, 2016

(54) IMAGE READING DEVICE HAVING BLANK-PAPER DETECTION UNIT AND IMAGE FORMING APPARATUS HAVING IMAGE READING DEVICE

(71) Applicant: CANON KABUSHIKI KAISHA, Tokyo (JP)

(72) Inventor: Shigeto Tanaka, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/676,247

(22) Filed: Apr. 1, 2015

(65) Prior Publication Data

US 2015/0288838 A1 Oct. 8, 2015

(30) Foreign Application Priority Data

Apr. 2, 2014 (JP) .................................. 2014-076174

(51) Int. Cl.
*H04N 1/04* (2006.01)
*H04N 1/00* (2006.01)

(52) U.S. Cl.
CPC ........ *H04N 1/00742* (2013.01); *H04N 1/0057* (2013.01); *H04N 1/00692* (2013.01); *H04N 1/00708* (2013.01)

(58) Field of Classification Search
CPC ................. H04N 2201/0081; H04N 1/00795; H04N 1/00708; H04N 1/00724; H04N 1/00748; H04N 1/00037; H04N 1/00034
See application file for complete search history.

(56) References Cited

U.S. PATENT DOCUMENTS

| | | | | |
|---|---|---|---|---|
| 5,798,841 A * | 8/1998 | Takahashi | ............ | H04N 1/1017 358/296 |
| 6,900,902 B1 * | 5/2005 | Tanaka | ............... | H04N 1/00005 271/286 |
| 7,916,942 B1 * | 3/2011 | Ohara | .................. | H04N 1/4074 358/1.14 |
| 2002/0057471 A1 * | 5/2002 | Tang | ..................... | H04N 1/0402 358/514 |
| 2005/0196209 A1 * | 9/2005 | Lyu | ........................ | G03G 15/607 399/376 |
| 2012/0013952 A1 * | 1/2012 | Shimizu | ............. | H04N 1/00002 358/448 |
| 2012/0081761 A1 | 4/2012 | Nakamura et al. | | |
| 2013/0170002 A1 * | 7/2013 | Matsui | ..................... | H04N 1/04 358/498 |
| 2014/0293354 A1 * | 10/2014 | Itoh | ..................... | G06K 15/1886 358/1.16 |
| 2014/0376021 A1 * | 12/2014 | Nishiyama | .................... | 358/1.13 |
| 2015/0002911 A1 * | 1/2015 | Matsui | .......... | 358/453 |

(Continued)

FOREIGN PATENT DOCUMENTS

JP 2006279094 A 10/2006
JP 2012080231 A 4/2012

*Primary Examiner* — Negussie Worku
(74) *Attorney, Agent, or Firm* — Rossi, Kimms & McDowell LLP

(57) ABSTRACT

An image reading device capable of avoiding erroneous determination in blank-paper detection of an original of an irregular size even when different width originals mixed and loaded are processed at a time. An original placed on a tray is conveyed through a conveyance path. An image reading sensor reads an image of the original. A blank-paper detection unit determines whether the original is blank paper. A determination unit determines whether the original is a regular size or an irregular size. A control unit controls not to output image data of the original when the determination unit determines that the original is a regular size and the blank-paper detection unit determines that the original is blank paper, and controls to output image data of the original when the determination unit determines that the original is an irregular size and the blank-paper detection unit determines that the original is blank paper.

10 Claims, 8 Drawing Sheets

(56) References Cited

U.S. PATENT DOCUMENTS

| | | | |
|---|---|---|---|
| 2015/0029563 A1* | 1/2015 | Tao | H04N 1/00771 358/498 |
| 2015/0070736 A1* | 3/2015 | Yoneyama | 358/504 |
| 2015/0156358 A1* | 6/2015 | Yabuuchi | 358/497 |
| 2015/0156371 A1* | 6/2015 | Yokomizo | 358/501 |
| 2015/0181064 A1* | 6/2015 | Yabuuchi | 358/474 |
| 2015/0304512 A1* | 10/2015 | Nishiyama | 358/474 |

* cited by examiner

IMAGE READING DEVICE HAVING BLANK-PAPER DETECTION UNIT AND IMAGE FORMING APPARATUS HAVING IMAGE READING DEVICE

BACKGROUND OF THE INVENTION

1. Field of the Invention

The present invention relates to an image reading device that has a blank-paper detection unit for detecting a blank-paper original, and to an image forming apparatus equipped with the image reading device.

2. Description of the Related Art

There is a known image reading device equipped with a moving image reading means that reads originals while feeding originals stacked on an original tray one by one by an automatic document feeder (hereinafter referred to as an "ADF"). In such an image reading device, when an original passes over a read glass of an image reading section, an original is irradiated with a light from a light source and a reflected light from the original is reflected by mirrors so that the light enters an image pickup device, such as a CCD, to read an image through an image formation lens.

However, if a user erroneously mixes a blank-paper original on which no image is formed into a bundle of originals when copying a plurality of originals continuously, a blank sheet that is not needed to print essentially is output as a result of a copy of the blank-paper original. In this case, there is a problem that a paper resource is consumed vainly. Similarly, when reading results of originals are saved as an image file, and when an image of a blank-paper original that is not needed to save essentially is saved erroneously, file capacity becomes larger than needed. Then, since data of a blank page that a user does not intend is mixed in a file, the data that is not desirable for a user is saved.

In order to solve such a problem, there is a known technique that provides a blank-paper detection means so that image data of an original determined as a blank-paper original without printing information is not copied or is not saved as a file, and that excepts a blank-paper original from an image processing target.

Incidentally, the blank-paper detection means determines whether an original is blank paper by determining whether printing information is included in an image area. And accordingly, the blank-paper detection means needs to change a setting about an image area within which blank-paper detection is performed (hereinafter referred to as a "blank-paper detection area") according to a size of an original (hereinafter referred to as an "original size"). For example, when the blank-paper detection area is set outside an original (i.e., is set as an area wider than an actual original), garbage adhered outside the original may be detected as printing information, which causes erroneous detection that a blank-paper original is not detected as a blank-paper original. On the other hand, when the blank-paper detection area is set inside an original (i.e., is set as an area narrower than an actual original), an original including useful printing information in its peripheral area may be erroneously detected as a blank-paper original. When the useful printing information, such as a page number or a ruled line, is printed in an original, a user wants not to determine that the original is a blank-paper original, in general. Thus, the image reading device that has the blank-paper detection means is required to set the blank-paper detection area correctly according to an original size.

There is a suggested image processing apparatus that is provided with a first determination function for performing blank-paper detection in the entire reading area, and a second determination function for performing blank-paper detection in an effective image area that is formed by cutting off an edge of the reading area (see Japanese Laid-Open Patent Publication (Kokai) No. 2006-279094 (JP 2006-279094A)). In this image processing apparatus, even in a case where the first determination function determines that an original is not blank paper, when the second determination function determines that the original is blank paper, the result of the second determination function takes priority, and it is determined that the original is blank paper. This image processing apparatus seems to enable a correct blank-paper determination because the blank-paper determination is executed by excepting an area in which an erroneous determination may occur.

Moreover, there is a suggested technique that displays a blank-paper detection area on a screen of an operation unit of an image reading device so that a user can change a setting about the blank-paper detection area as needed (see Japanese Laid-Open Patent Publication (Kokai) No. 2012-80231 (JP 2012-80231A)).

However, the technique of JP 2006-279094A is difficult to set the blank-paper detection area correctly when a user copies, at a time, an original bundle in which originals of a regular size and originals of an irregular size are mixed. For example, even if the blank-paper detection area of an original of an irregular size is set as the same as the blank-paper detection area of an original of the nearest regular size, there is a possibility that the blank-paper detection area includes an area outside the original or that the image area is cut off and necessary printing information is overlooked. Moreover, even when a user designates a regular size on the operation screen, an original size to be actually copied may different from the designated size. Particularly, a blank-paper detection area of an original of an irregular size cannot be set correctly even when a user designates the blank-paper detection area of the original as the same as the blank-paper detection area of an original of the nearest regular size.

On the other hand, since the technique of JP 2012-80231A needs to check whether the blank-paper detection area is set correctly while looking the setting result on the operation screen one by one or needs to change the setting of the blank-paper detection area, the operation is complicated for a user. Moreover, in the case of where different width originals are mixed and loaded on a tray in order to copy the originals at a time, since a blank-paper detection area cannot be determined uniquely, a user needs to adjust a blank-paper detection area for every sheet, which takes time too much and is poor in practicality.

In this way, an image reading device that has a blank-paper detection means has a problem in that a setting of a blank-paper detection area is not easy and that erroneous determination in blank-paper detection easily occurs due to erroneous setting of blank-paper detection area. In particular, an original of an irregular size has high possibility of causing erroneous determination in blank-paper detection.

SUMMARY OF THE INVENTION

The present invention provides an image reading device and an image forming apparatus equipped with the image reading device, which are capable of avoiding erroneous determination in blank-paper detection of an original of an irregular size even when different width originals mixed and loaded are processed at a time.

Accordingly, a first aspect of the present invention provides an image reading device includes a tray on which an original is placed, a conveyance path through which the original placed on the tray is conveyed to an image reading position, an image reading sensor configured to read an image of the original, a blank-paper detection unit configured to determine whether the original conveyed through the conveyance path is blank paper, a determination unit configured to determine whether the original is a regular size or an irregular size, and a control unit configured to control not to output image data of the original in the case where the determination unit determines that the original is a regular size and the blank-paper detection unit determines that the original is blank paper, and to control to output image data of the original in the case where the determination unit determines that the original is an irregular size and the blank-paper detection unit determines that the original is blank paper.

Accordingly, a second aspect of the present invention provides an image forming apparatus equipped with the image reading device of the first aspect.

According to the present invention, when an original that is conveyed through a conveyance path is determined as an original of an irregular size, a determination result of the blank-paper detection unit is not employed. This avoids erroneous determination in blank-paper detection. For example, this avoids a disadvantage in that a no-blank original of an irregular size is erroneously determined as a blank original and image data about the original of the irregular size is not output.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
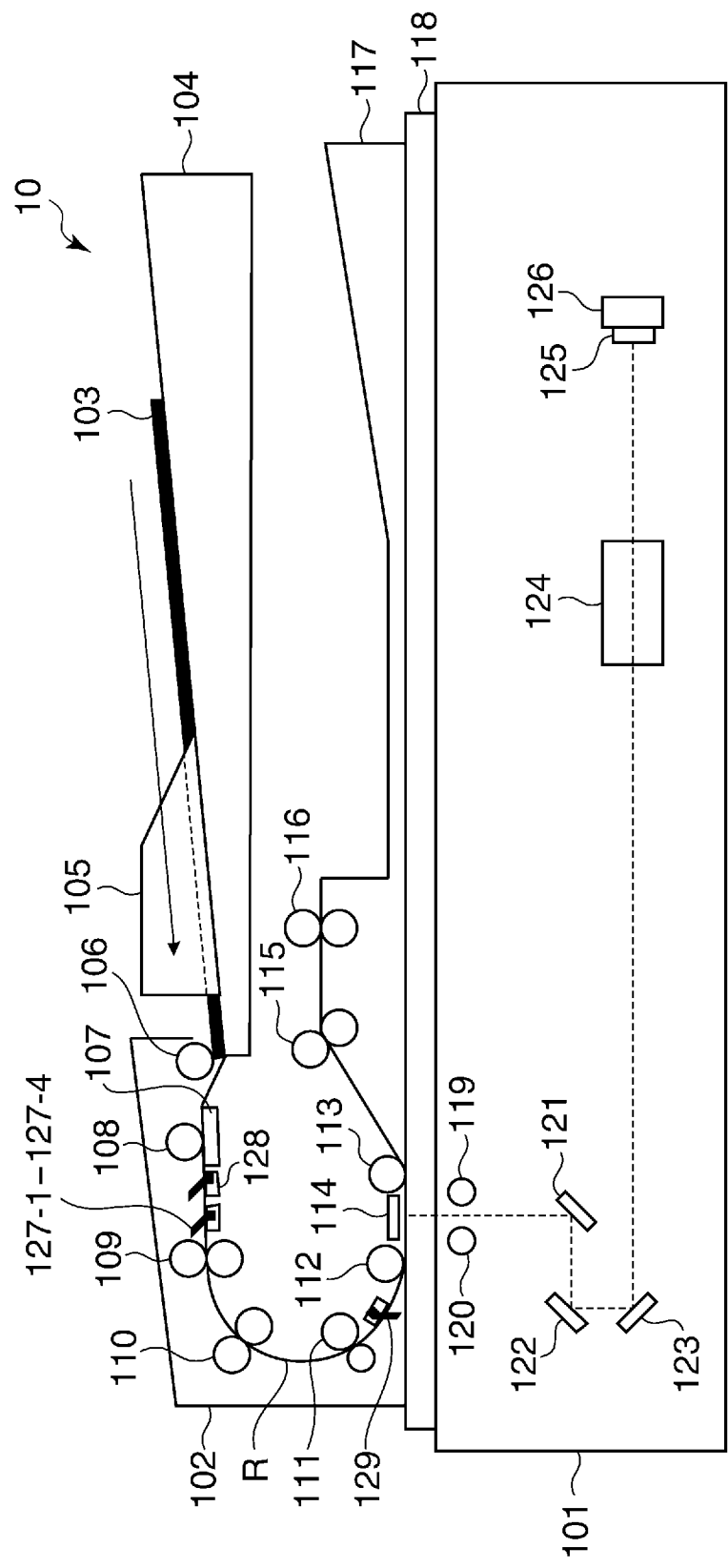
FIG. 1 is a sectional view schematically showing a configuration of an image reading device according to an embodiment of the present invention.

FIG. 1 is a sectional view schematically showing a configuration of an image reading device according to an embodiment of the present invention. The image reading device constitutes a part of an image forming apparatus, such as a copy machine, for example.

As shown in FIG. 1, the image reading device 10 mainly consists of a reading device body 101 and an automatic document feeder (ADF) 102, which is placed on the reading device body 101 through a read glass 118. The automatic document feeder 102 feeds an original to an image reading section of the reading device body 101 automatically.

The ADF 102 is provided with an original tray 104 as a tray on which an original (an original bundle) 103 is placed, width regulating plates 105 that regulate both ends of the original 103 in a principal scanning direction placed on the original tray 104, and a pickup roller 106 placed at an end of the original tray 104.

The ADF 102 has a conveyance path R along which the original 103 fed by the pickup roller 106 is conveyed to a sheet ejection tray 117 through the image reading section. At a downstream side of the pickup roller 106 on the conveyance path R, a separating section that is equipped with a separation pad 107 and a separating roller 108 is provided. The separating section sequentially separates the uppermost original 103 one by one from the original bundle placed on the original tray 104. It should be noted that a conveyance direction of an original (a horizontal direction in FIG. 1) is referred to as an auxiliary scanning direction, and a direction that intersects perpendicularly with the conveyance direction of an original (a direction perpendicular to a plane of FIG. 1) is referred to as the principal scanning direction, in the specification. Moreover, a length of the original 103 in the auxiliary scanning direction is only referred to as a "length" of the original, and a width in the principal scanning direction is referred to as a "principal scanning width".

At the downstream side of the separating section, a first registration roller pair 109, a second registration roller pair 110, a first conveyance roller pair 111, a second conveying roller 112, a third conveyance roller 113, a fourth conveyance roller pair 115, and an ejecting roller pair 116 are arranged in order. Between the separating roller 108 and the first registration roller pair 109, a post-separation sensor 128 for detecting the length of the original 103 in the auxiliary scanning direction, and flag sensors 127-1 through 127-4 for detecting the principal scanning width of the original 103 are disposed. The flag sensors 127-1 through 127-4 are called a flag sensor group 127 as a whole. Moreover, between the first conveyance roller pair 111 and the second conveying roller 112, a read sensor 129 for detecting the length of the original 103 in cooperation with the post-separation sensor 128 is arranged. The flag sensor group 127, the post-separation sensor 128, and the read sensor 129 will be described in detail later.

In the image reading section between the second conveying roller 112 and the third conveyance roller 113 on the conveyance path R, a white guide member 114 is disposed facing to the read glass 118 across the conveyance path R. The white guide member 114 prevents floating of the original at the time of reading. Light sources 119 and 120 are provided at the side of the reading device body 101 of the image reading section. Under the light sources 119 and 120, there are a mirror group consisting of mirrors 121, 122, and 123, an image formation lens 124, a color line sensor 125 as an image reading sensor in which image pickup elements, such as CCDs, are linearly arranged, and a signal processing substrate 126.

Figure 2:
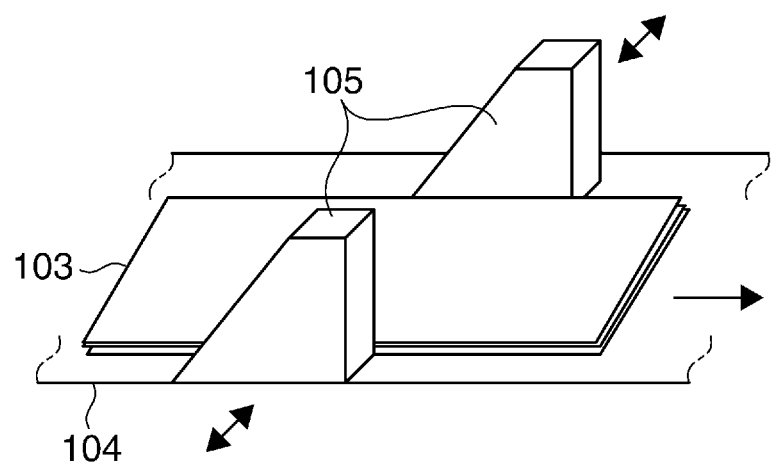
FIG. 2 is a perspective view showing width regulating plates on an original tray of the image reading device shown in FIG. 1.

FIG. 2 is a perspective view showing the width regulating plates 105 on the original tray 104.

As shown in FIG. 2, a pair of the width regulating plates 105 regulates the both ends of the original 103 placed on the original tray 104 in the principal scanning direction. The positions of the width regulating plates 105 interlock with a width-restriction-plate sensor 105a (see FIG. 3) that consists of a volume resistance implemented in a substrate (not shown) in the ADF 102. The positions of the width regulating plates 105 are detected on the basis of output voltage generated by the width-restriction-plate sensor 105a. And accordingly, the principal scanning width of the original 103 placed on the original tray 104 is detected.

In the image reading device 10 having such a configuration, the both ends of the original 103, which is placed on the original tray 104 by a user, in the principal scanning direction are regulated by the width regulating plates 105. This reduces skew feeding of the original 103. The pickup roller 106 conveys the original bundle including the original 103 placed on the original tray 104 to the separating section. The separation pad 107 and the separate roller 108 cooperate to separate the uppermost original 103 from the original bundle and to convey it to the downstream one by one.

The first registration roller pair 109 adjusts a direction of the original 103, and conveys the original 103 to the second registration roller pair 110, the first conveyance roller pair 111, the second conveying roller 112, and the third conveyance roller 113. The fourth conveyance roller pair 115 and the ejecting roller pair 116 convey the original 103 that passed through the third conveyance roller 113 to the sheet ejection tray 117 at the downstream side, and the original is ejected onto the sheet ejection tray 117.

The light sources 119 and 120 irradiate the lower surface of the original 103 that passes through the image reading section between the second conveying roller 112 and the third conveyance roller 113 with light. The mirrors 121, 122, and 123 reflect the reflected light from the original 103 so as to guide the light to the image formation lens 124. The reflected light guided to the image formation lens 124 is converged and forms an image on the color line sensor 125. The color line sensor 125 converts a light signal of the formed image into an electrical signal. The signal processing substrate 126 converts the electrical signal into a digital signal to obtain image data.

Figure 3:
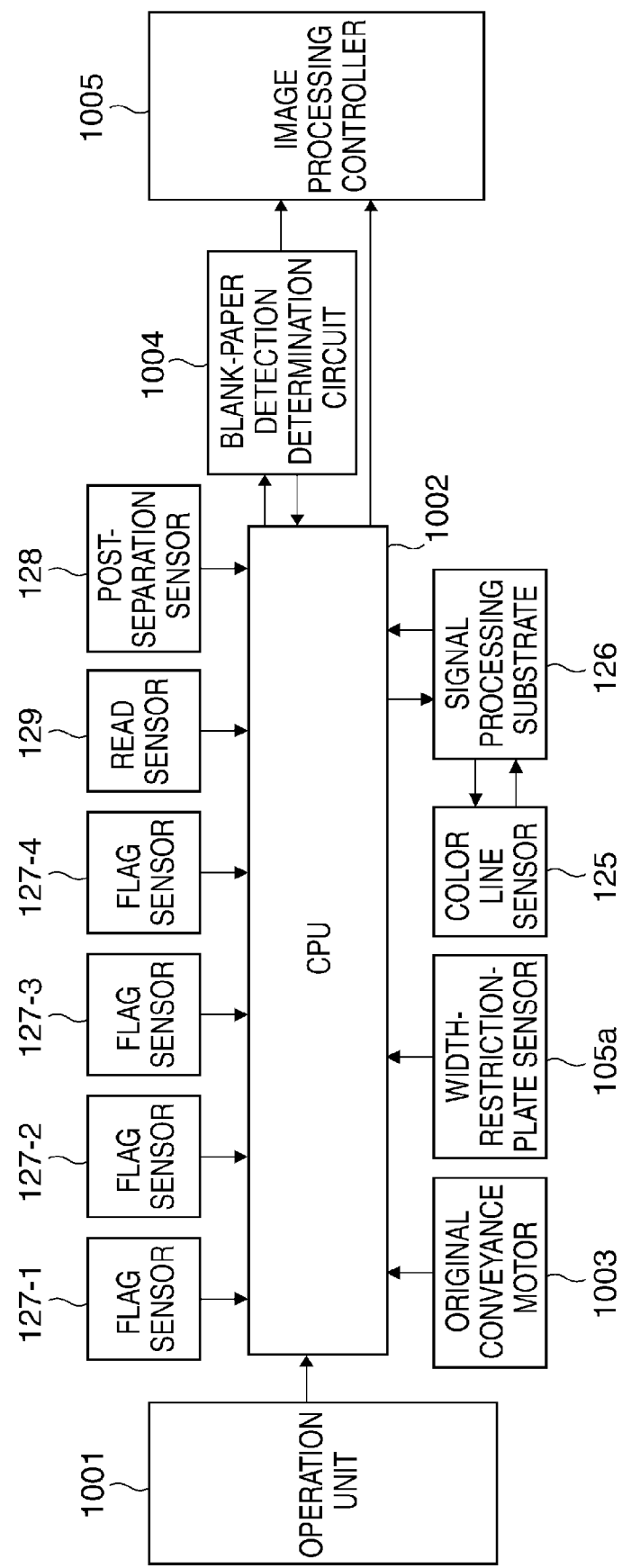
FIG. 3 is a block diagram schematically showing a control system of the image reading device shown in FIG. 1.

FIG. 3 is a block diagram schematically showing a control system of the image reading device 10. The image reading device 10 has an operation unit 1001, and the operation unit 1001 is connected to a CPU 1002. The CPU 1002 connects and communicates with the flag sensors 127-1 through 127-4, the post-separation sensor 128, the read sensor 129, the original conveyance motor 1003, the width-restriction-plate sensor 105a, which are detection sensors, and the signal processing substrate 126 that is connected to the color line sensor 125. The CPU 1002 is connected to a blank-paper detection determination circuit 1004. The CPU 1002 is connected to the image processing controller 1005 directly, and is connected via the blank-paper detection determination circuit 1004.

The CPU 1002 instructs an original conveyance motor 1003 to rotate, and conveyance of an original starts when the original conveyance motor 1003 rotates. Moreover, the CPU 1002 instructs the color line sensor 125 to start an operation. As a result of this, the color line sensor 125 start an operation by electric power supplied from a power source. Each of the flag sensors 127-1 through 127-4, the post-separation sensor 128, and the read sensor 129 outputs an interrupt signal that means passage, when the original 103 passes over the corresponding detection sensor. On the basis of the interrupt signals from the detection sensors and positional information from the width-restriction-plate sensor 105a, the CPU 1002 detects the principal scanning width and length of the original 103, and determines the original size (first determination). Moreover, when fixing the original size, the CPU 1002 transmits the size of the output sheet on which the image of the original is copied, to the image processing controller 1005, and transmits the blank-paper detection area used for the blank-paper detection to the blank-paper detection determination circuit 1004 simultaneously.

The signal processing substrate 126 transmits the image data obtained by converting the electrical signal received from the color line sensor 125, to the CPU 1002. The CPU 1002 obtains detected data of shadow of an original front end generated when the original 103 passes through the image reading section from the image data transmitted from the signal processing substrate 126, and determines the principal scanning width of the original 103 on the basis of the detected data (second determination). The blank-paper detection determination circuit 1004 determines whether the original 103 is blank paper on the basis of the image data transmitted to the CPU 1002 from the signal processing substrate 126 and the size of the blank-paper detection area transmitted from the CPU 1002.

The CPU 1002 compares the determination results of principal scanning width of the original in the first determination and second determination. When the results coincide, the CPU 1002 determines that the original 103 conveyed through the conveyance path R is an original of a regular size, and transmits a fact that the blank-paper detection result is valid to the blank-paper detection determination circuit 1004. In this case, the blank-paper detection determination circuit 1004 transmits a blank-paper detection result to the image processing controller 1005, and the blank-paper detection result is employed in the image process.

On the other hand, when the determination results of the principal scanning width of the original in the first determination and the second determination are different, the CPU 1002 determines that the original 103 conveyed through the conveyance path R is an original of an irregular size, and transmits a fact that the blank-paper detection result is invalid to the blank-paper detection determination circuit 1004. In this case, the blank-paper detection determination circuit 1004 transmits a fact that the blank-paper detection result is invalid because the original 103 is an irregular size, to the image processing controller 1005, and the blank-paper detection result is not employed in the image process.

That is, when the original 103 conveyed through the conveyance path R is a regular size and is blank paper, the image processing controller 1005 controls not to output a copy of the image data of the original 103. On the other hand, when the original 103 is not blank paper, or when the blank-paper detection result is invalid because the original 103 is an irregular size, the image processing controller 1005 outputs a copy of the image data of the original 103.

Next, an image reading process with the image reading device 10 shown in FIG. 1 will be described in detail.

Figure 4:
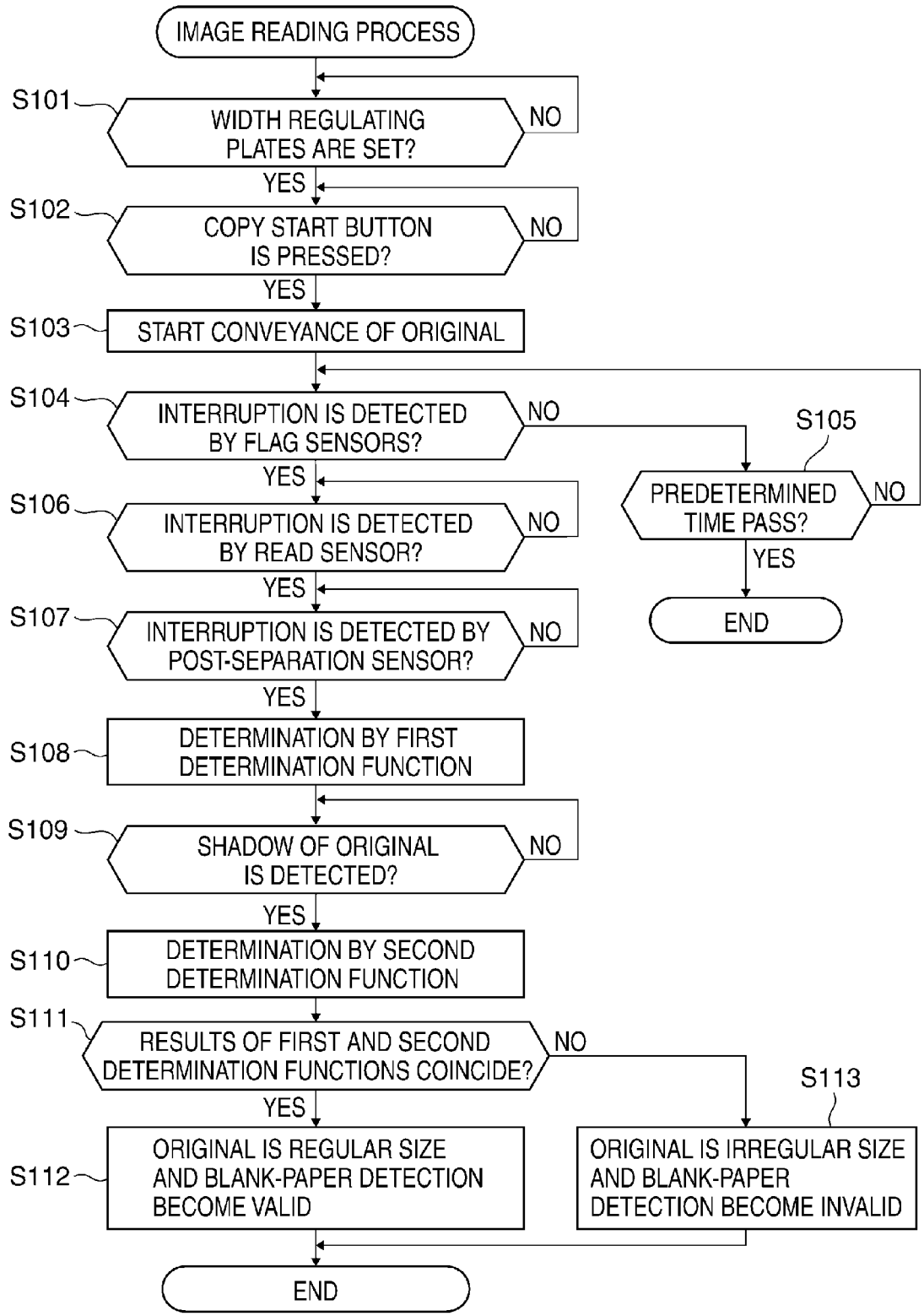
FIG. 4 is a flowchart showing an image reading process executed by the image reading device shown in FIG. 1.

FIG. 4 is a flowchart showing the image reading process executed by the image reading device shown in FIG. 1. The CPU 1002 executes this image reading process according to image reading procedures of an image reading program stored in a ROM (not shown).

As shown in FIG. 4, when starting the image reading process, the CPU 1002 determines whether the original 103 is placed on the original tray 104 and the width regulating plates 105 that regulate the both ends of the original 103 in the principal scanning direction are set by a user (step S101).

As a result of the determination in the step S101, when the width regulating plates 105 are set ("YES" in the step S101), the CPU 1002 stands by until a copy start button on an operation screen is pressed by the user (step S102). Next, after the copy start button is pressed by the user ("YES" in the step S102), the CPU 1002 starts conveyance of an original (step S103).

When the conveyance of an original is started by pressing the copy start button, the CPU 1002 determines whether interruption is detected by any of the flag sensors 127-1 through 127-4 (step S104). As a result of the determination in the step S104, when any of the flag sensors 127-1 through 127-4 detects interruption ("YES" in the step S104), the CPU 1002 stands by until interruption is detected by the read sensor 129 (step S106). Next, after the interruption is detected by the read sensor 129 ("YES" in the step S106), the CPU 1002 determines whether interruption is detected by the post-separation sensor 128 (step S107). After the interruption is detected by the post-separation sensor 128, the CPU 1002 determines the original size of the original 103 by a first determination function (step S108). That is, the CPU 1002 determines the principal scanning width and length of the original 103 on the basis of the interruption detection results of the width-restriction-plate sensor 105a and the flag sensors 127-1 through 127-4, and the interruption detection result of the post-separation sensor 128 at the time of detecting interruption of the read sensor 129.

Hereinafter, the first determination function that determines the original size on the basis of the principal scanning width and length of the original will be described in detail.

Figure 5:
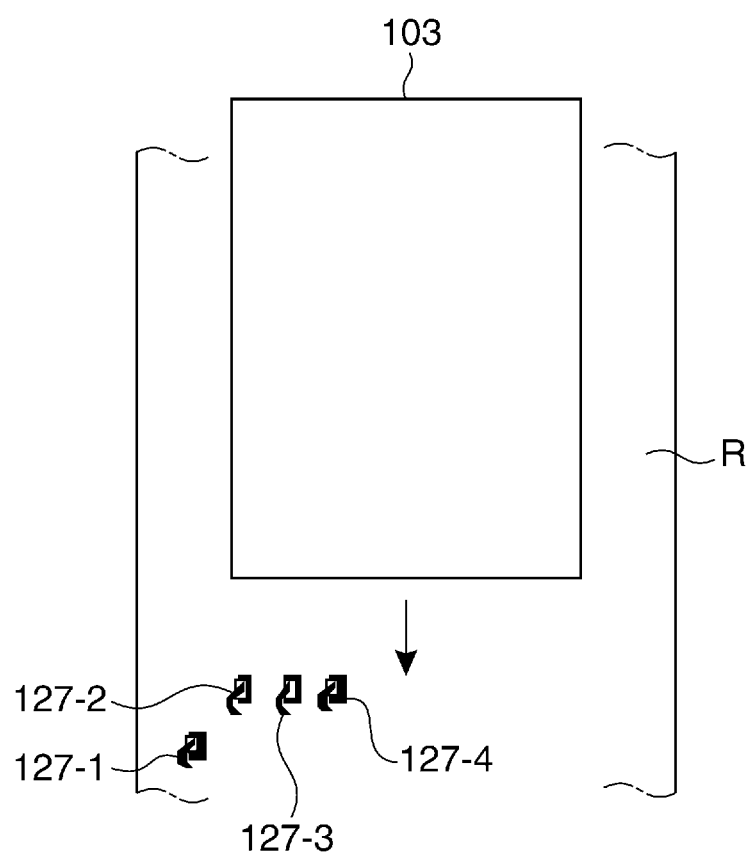
FIG. 5 is a plan view showing a flag sensor group on a conveyance path of the image reading device shown in FIG. 1.

FIG. 5 is a plan view showing the flag sensor group 127 on the conveyance path R. As shown in FIG. 5, the four flag sensors 127-1 through 127-4 are arranged in the principal scanning direction on the conveyance path R through which an original is conveyed. The flag sensor group 127 detects passage of the original 103 when a flag sensor arranged within the principal scanning width of the original 103 in the flag sensor group is laid down by the original 103 passed. The principal scanning width of the original 103 is roughly determined by specifying a flag sensor that is laid down by the original 103 in the flag sensor group 127.

Even when the different width originals that are mixed and loaded on the ADF 102 are copied in one job, a principal scanning width is determined for every original using the flag sensors in the flag sensor group 127. The flag sensors 127-1 through 127-4 are arranged at predetermined positions in the principal scanning direction on the conveyance path R, in order to determine the principal scanning width of a regular size that is beforehand defined according to a standard specification. Accordingly, a principal scanning width of original of an irregular size, which is not defined in the standard specification, cannot be determined with sufficient accuracy using the flag sensors 127-1 through 127-4.

On the other hand, the length of the conveyed original 103 in the auxiliary scanning direction is determined by monitoring the outputs of the post-separation sensor 128 and the read sensor 129. That is, it is monitored whether the post-separation sensor 128 has detected interruption at the time when the read sensor 129 detects the front end of the original 103 conveyed through the conveyance path R. In a case of an "ON" state where the post-separation sensor 128 has detected interruption by the original 103 at the time when the read sensor 129 detects the front end of the original 103, it is determined that the length of the original 103 is longer than the distance between the read sensor 129 and the post-separation sensor 128. On the other hand, in a case of an "OFF" state where the rear end of the original 103 has already passed the post-separation sensor 128 at the time when the read sensor 129 detects the front end of the original 103, it is determined that the length of the original 103 is shorter than the distance between the read sensor 129 and the post-separation sensor 128.

Then, the original size is determined on the basis of the combination of the detection results of the read sensor 129 and post-separation sensor 128, the detection result of the principal scanning width by the width-restriction-plate sensor 105a mentioned above, and the detection result of the principal scanning width by the flag sensor group 127.

The following table 1 shows a correspondence between an original size (and principal scanning width of an original) and a combination of a width of the width-regulating plates that is detected by the width-restriction-plate sensor 105a, ON/OFF states of the flag sensors 127-1 through 127-4 on the conveyance path R, and an ON/OFF state of the post-separation sensor 128 at the time of "ON" of the read sensor 129. It should be noted that an original size with "R" in the table 1 means a case where the original 103 is set on the original tray 104 so that the lengthy direction of the original 103 becomes parallel to the auxiliary scanning direction. On the other hand, an original size without "R" means a case where the original 103 is set on the original tray 104 so that the lengthy direction of the original 103 becomes parallel to the principal scanning direction. Moreover, "ON" of each sensor shows that interruption is detected, and "OFF" shows that interruption is not detected.

TABLE 1

| Width of regulating plates [mm] | Flag sensor 127-1 | Flag sensor 127-2 | Flag sensor 127-3 | Flag sensor 127-4 | Post-separation sensor at ON of read sensor | Original size | Scanning width [mm] |
|---|---|---|---|---|---|---|---|
| Width > 272 | ON | — | — | — | ON | A3R | 297 |
|  | ON | — | — | — | OFF | A4 | 297 |
|  | OFF | ON | — | — | ON | B4R | 257 |
|  | OFF | ON | — | — | OFF | B5 | 257 |
|  | — | OFF | — | ON | ON | A4R | 210 |
|  | — | OFF | — | ON | OFF | A5 | 210 |
|  | — | — | — | OFF | — | B5R | 182 |

TABLE 1-continued

| Width of regulating plates [mm] | Flag sensor 127-1 | Flag sensor 127-2 | Flag sensor 127-3 | Flag sensor 127-4 | Post-separation sensor at ON of read sensor | Original size | Scanning width [mm] |
|---|---|---|---|---|---|---|---|
| 272 ≥ Width > 247 | ON | — | — | — | ON | B4R | 257 |
|  | ON | — | — | — | OFF | B5 | 257 |
|  | OFF | — | ON | — | ON | A4R | 210 |
|  | OFF | — | ON | — | OFF | A5 | 210 |
|  | — | — | OFF | ON | — | B5R | 182 |
|  | — | — | — | OFF | — | A5R | 148 |
| 247 ≥ Width > 200 | — | ON | — | — | ON | A4R | 210 |
|  | — | ON | — | — | OFF | A5 | 210 |
|  | — | OFF | ON | — | — | B5R | 182 |
|  | — | OFF | OFF | — | — | A5R | 148 |
|  | — | OFF | OFF | — | — | B6R | 128 |
| 200 ≥ Width > 172 | — | — | ON | — | — | B5R | 182 |
|  | — | — | OFF | — | — | A5R | 148 |
|  | — | OFF | OFF | — | — | B6R | 128 |
| 172 ≥ Width | — | — | ON | — | — | A6R | 148 |
|  | — | — | OFF | — | — | B6R | 128 |

As shown in the table 1, which of regular sizes corresponds to the original 103 conveyed through the conveyance path R is determined on the basis of the detection result of the width-restriction-plate sensor 105a, the detection results of the flag sensor group 127, and the ON/OFF state of the post-separation sensor 128 at the time of "ON" of the read sensor 129.

It should be noted that the table 1 is used for choosing an original size from among the regular sizes that are beforehand defined with the standard specification, such as the JIS (Japanese Industrial Standard). On the other hand, a detection result may differ from an actual width of an original. Particularly, in a case where different width originals are mixed and loaded, accuracy of determining whether an original is a regular size or an irregular size tends to become low due to the configuration of the device. This is because the width regulating plates 105 regulate the originals of different principal scanning widths on the original tray 104 with the largest width only. In this case, the principal scanning widths of originals other than the original of the largest width are determined on the basis of the interruption detection results of the flag sensors 127-1 through 127-4. However, since the flag sensors 127-1 through 127-4 are located only at the predetermined positions (four positions) in the principal scanning direction, it is not easy to detect the principal scanning width of the original 103 correctly.

Referring back to FIG. 4, after determining the original size of the original 103 by the first determination function (step S108), the CPU 1002 determines whether shadow of the front end of the original 103 is detected (step S109) because the original 103 passes through the image reading section at which the white guide member 114 is disposed. As a result of the determination in the step S109, when the shadow of the front end of the original 103 is detected ("YES" in the step S109), the CPU 1002 executes determination of the principal scanning width by the second determination function (step S110).

The second determination function will be described in detail with reference to FIG. 6.

Figure 6:
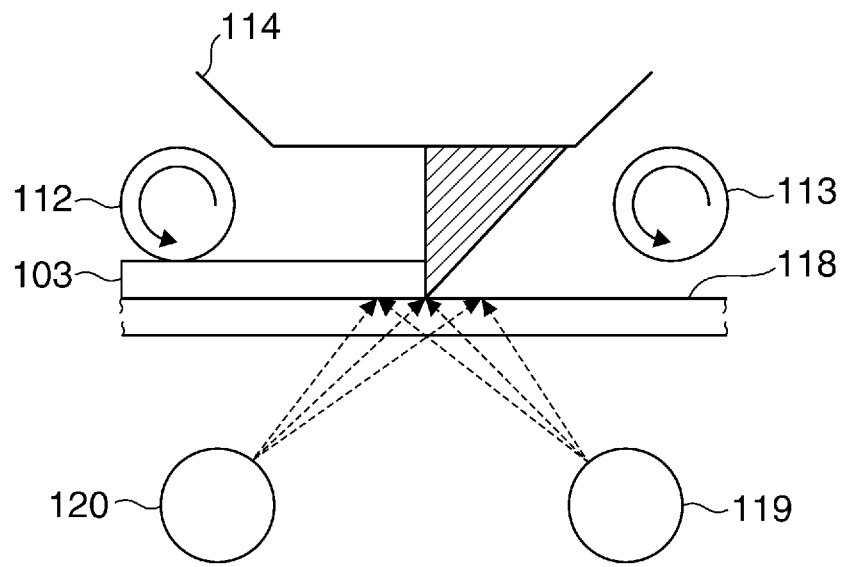
FIG. 6 is an expanded sectional view showing a portion adjacent to an image reading section in the image reading device shown in FIG. 1.

FIG. 6 is an expanded sectional view showing a portion adjacent to the image reading section in the image reading device 10 shown in FIG. 1. As shown in FIG. 6, when passing through the image reading section, the original 103 is conveyed in contact with the read glass 118 by the second conveying roller 112 and the third conveyance roller 113. At this time, a part of light emitted from the light source 120 located at the upstream side in the conveyance direction of the original 103 is obstructed by the front end of the original 103 when the front end of the original 103 passes through the image reading section. Then, the shadow of the front end of the original 103 is formed on the white guide member 114 because a part of light is obstructed. Such a phenomenon occurs only in the principal scanning direction of front end of the original 103 that passes through the image reading section. Accordingly, the principal scanning width of the original 103 is found by measuring the length of the shadow formed on the white guide member 114 in the principal scanning direction when the front end of the original 103 passes the image reading section.

Figure 7:
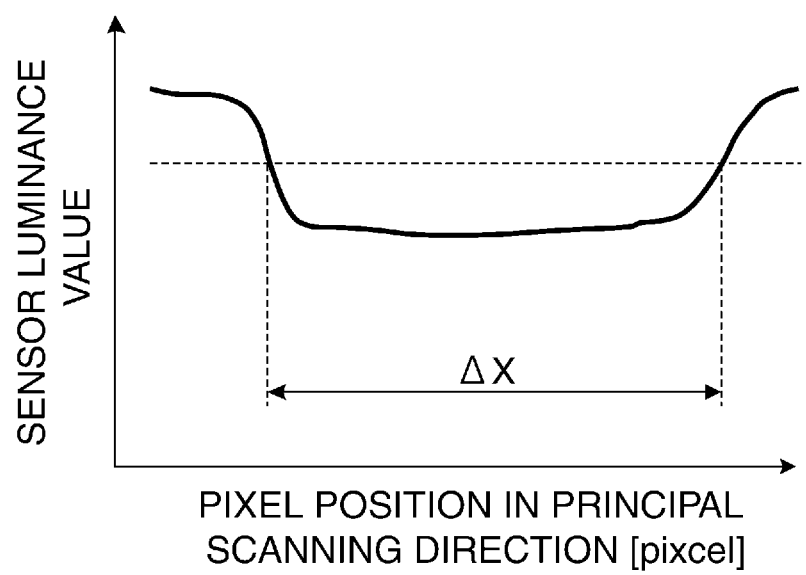
FIG. 7 is a graph showing a sensor luminance value of a color line sensor at the time when a front end of an original passed through the image reading section in the image reading device shown in FIG. 1.

FIG. 7 is a graph showing a sensor luminance value of the color line sensor 125 at the time when the front end of the original 103 passes through the image reading section. Although a color line sensor outputs luminance values of three colors (R, G, and B), a luminance value of only one color is indicated in FIG. 7 because it is enough to detect a shadow.

In FIG. 7, a horizontal axis indicates a pixel position in the principal scanning direction (i.e., a principal scanning position), and a vertical axis indicates the sensor luminance value. If a shadow is formed on the white guide member 114 at the time when the front end of the original passes through the image reading section, the sensor luminance value of the color line sensor 125 to which the light is entered via the mirrors 121 through 123 and the image formation lens 124 becomes low. Accordingly, the pixel count ΔX that is the number of pixels of the color line sensor 125 of which the sensor luminance values at the time when the front end of the original passes through the image reading section are equal to or lower than a predetermined threshold is detected. Then, the principal scanning width of the original 103 is determined on the basis of the product of the pixel count ΔX and the pixel width of one pixel.

Referring back to FIG. 4, after determining the size (the principal scanning width) of the original 103 by the second determination function (step S110), the CPU 1002 determines whether the determination results of the first determination function and second determination function coincide (step S111). As a result of the determination in the step S111, when the determination result of the first determination function coincides with the determination result of the second determination function ("YES" in the step S111), the CPU 1002 determines that the original 103 is the regular size determined by the first determination function. Then, the CPU 1002 makes the determination result of the blank-paper detection determination circuit be valid (step S112), and finishes this process.

A case where the determination result of the first determination function coincides with the determination result of the second determination function will be specifically described hereinafter.

When read resolution of the color line sensor 125 used by the second determination function is 600 dpi, the pixel width per one pixel is 0.0423 mm. Accordingly, when the second determination function detects that the pixel count ΔX in FIG. 7 is 6076 pixels, the principal scanning width is determined as 257 mm according to the following formula.

$$\begin{aligned}\text{Principal Scanning width of original} &= \Delta X \cdot 0.0423 \\ &= 6076 \cdot 0.0423 \\ &\approx 257 \text{ [mm]}\end{aligned}$$

On the other hand, the first determination function that determines the original size shall determine that the original size is B4R or B5. Since the principal scanning width of the B4R size and B5 size is 257 mm, the determination result of the first determination function coincides with 257 mm that is the determination result of the second determination function that determines the principal scanning width of the original. That is, since the determination results of the first determination function that determines the original size and second determination function that determines the principal scanning width of the original coincide, it is determined that the original 103 conveyed through the conveyance path R is an original of the regular size of B4R or B5.

A reason why the original 103 is determined as the regular size and the determination result of the blank-paper detection circuit is valid when the determination results of the first determination function and second determination function coincide will be described below.

In the first determination function that determines the original size, since the flag sensors 127-1 through 127-4 are arranged only at the predetermined positions in the principal scanning direction on the conveyance path R, the detection accuracy of principal scanning width of the original is limited to some extent. Moreover, the width regulating plates 105 detect the principal scanning width of only the original of the largest principal scanning width. On the other hand, the second determination function that determines the principal scanning width of the original detects the principal scanning width of the original on the basis of the length of the shadow that occurs only in the front end of the original. Accordingly, the detection accuracy of principal scanning width of the second determination function is quite higher than that of the first determination function.

Figure 8:
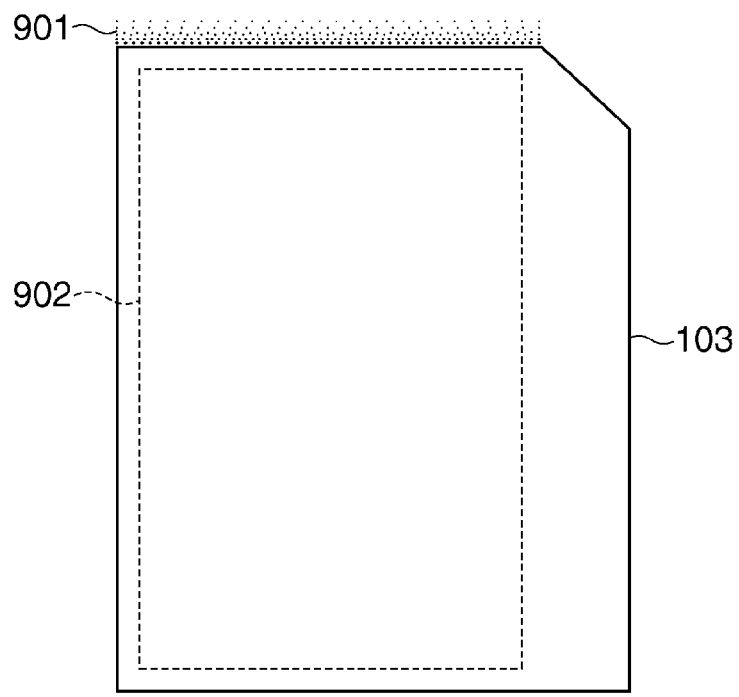
FIG. 8 is a view showing image data of a corner folded original.

However, the second determination function has a problem in that a principal scanning width of an original of which a corner of the front end is folded or is cut away as shown in FIG. 8 cannot be detected correctly. That is, since the corner folded portion of the original front end is oblique to the original conveyance direction, the light from the light source 120 cannot be obstructed enough. Accordingly, the shadow 901 owing to obstruction of the light from the light source 120 is hard to occur in the corner folded portion of the original front end. In this case, the second determination function that determines the principal scanning width on the basis of the length of the shadow 901 of the original front end determines the detection result of the principal scanning width that is shorter than the actual principal scanning width. Moreover, the determination result of the second determination function does not coincide with the determination result of the first determination function in this case.

Then, if the blank-paper detection area of the original 103 is set on the basis of the result that is determined as shorter than the actual principal scanning width, the blank-paper detection area 902 becomes narrower than that of an original of which corners are not folded by the width corresponding to the folded corner. This may cause erroneous blank-paper determination because printing information, such as the page number and a ruled line, that is important for a user and that is printed in a peripheral area on an original may be excluded from the blank-paper detection determination area.

In this way, the detection accuracy of the principal scanning width by the second determination function is quite higher than that by the first determination function. However, if the blank-paper detection area is selected only on the basis of the determination result of the second determination function, erroneous determination about the blank-paper detection may occur. Accordingly, when both the determination results of the first determination function that determines the original size and second determination function coincide (i.e., when correctness of the first determination result (the determination result of the regular size) is supported by the determination result of the second determination function), it is determined that the determination result is correct.

When the first determination result and the second determination result coincide, the original 103 is determined as the regular size. Since the blank-paper detection area is set with sufficient accuracy in the original of the regular size by cutting an edge off, there is low possibility of the erroneous decision about the blank-paper detection. Accordingly, when the original 103 is a regular size, the determination result of the blank-paper detection determination becomes valid. In such a case, when the original is determined as blank paper, the read image is not copied or is not saved in a file. This avoids inconvenience that a blank-paper original is copied or is saved in a file in a case where the original 103 is blank paper.

On the other hand, referring back to FIG. 4, when it is determined that the determination results of the first determination function and second determination function differ ("NO" in the step S111), the CPU 1002 determines that the original 103 is an irregular size, and disables the determination result of the blank-paper detection determination circuit 1004 (step S113). Then, the CPU 130 finishes this process.

A case where the determination result of the first determination function does not coincide with the determination result of the second determination function will be specifically described hereinafter.

For example, when the pixel count ΔX in FIG. 7 is detected as 5508 pixels, the principal scanning width of the original 103 is found as 233 [mm] by converting the pixel count ΔX into distance using the following formula.

$$\begin{aligned}\text{Principal Scanning width of original} &= \Delta X \cdot 0.0423 \\ &= 5508 \cdot 0.0423 \\ &\approx 233 \text{ [mm]}\end{aligned}$$

At this time, it is assumed that the original size of the original 103 was determined as A4R or A5 by the first determination function (step S108) mentioned above. Since the principal scanning width of A4R and A5 is 210 mm, error difference of 23 mm occurs with respect to the principal scanning width of 233 mm computed by the second determination function that determines the principal scanning width of an original. Namely, as a result of the determination in the step S111, the determination result of the first determination function for determining the original size differs from the determination result of the second determination function for determining scanning width of the original ("NO" in the step S111). Accordingly, the CPU 1002 determines that the original 103 is not a regular size but an irregular size, and determines that the blank-paper detection determination is invalid (step S113). In this case, since the blank-paper detection determination is invalid, the blank-paper detection result is not employed irrespective of a content of the result. That is, the original of the irregular size concerned is copied or saved in a file. As a result of this, an original of an irregular size, which easily causes erroneous determination in blank-paper detection, is always copied or saved in a file. This avoids a disadvantage that a no-blank original of an irregular size is not copied or saved in a file due to erroneous determination in the blank-paper detection.

In this case, a blank original of an irregular size is copied or saved in a file. However, this is an unavoidable process in order to avoid the situation where a no-blank original of an irregular size is not copied or saved in a file.

On the other hand, as a result of the determination in the step S104, when interruption is not detected by the flag sensor group 127 ("NO" in the step S104), and when predetermined time passes ("YES" in the step S105), the CPU 1002 determines that the original did not pass over the flag sensors, and finishes this process.

In the image read process in FIG. 4, the blank-paper detection determination of the original 103 is executed at the same time of determining the principal scanning width by the second determination function (step S110) or is executed after the determination of the second determination function.

Hereinafter, a blank-paper determination method by the blank-paper detection determination circuit 1004 will be described in detail.

Figure 9:
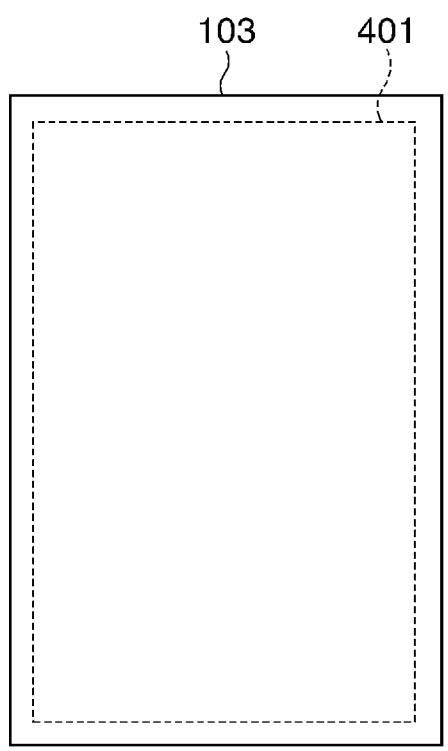
FIG. 9 is a view showing a relationship between an original size and a blank-paper detection area in a case where an original is read with the image reading device shown in FIG. 1.

FIG. 9 is a view showing a relation between an original size obtained by reading the original 103 and a blank-paper detection area 401 set inside the original area. The color line sensor 125 reads image data of an area wider than the principal scanning width of the original 103.

Figure 10:
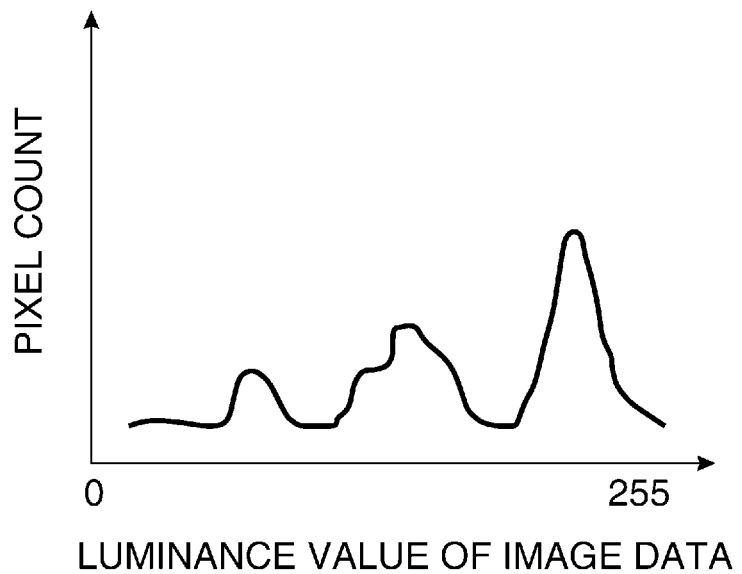
FIG. 10 is a histogram showing image data of a blank-paper detection area in an original containing printing information.
Figure 11:
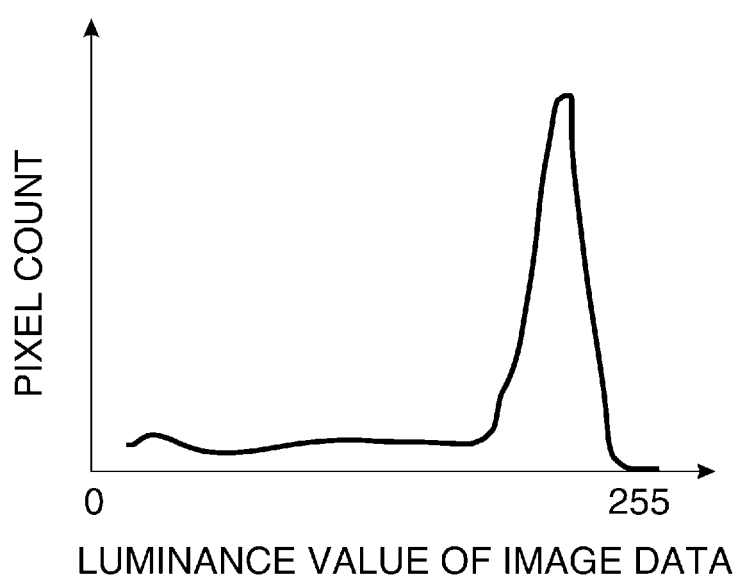
FIG. 11 is a histogram showing image data of the blank-paper detection area in a blank-paper original that does not contain printing information.

FIG. 10 is a histogram showing image data of the blank-paper detection area in an original containing printing information. Moreover, FIG. 11 is a histogram showing image data of the blank-paper detection area in a blank-paper original that does not contain printing information.

When printing information like characters is printed on an original, a histogram has variation and peaks appear at a plurality of positions as shown in FIG. 10 because luminance values about the printing information are included besides the luminance value that indicates the ground of the original. On the other hand, in a case of a blank-paper original, since the frequency of the luminance value that indicates the ground of the original becomes high, a peak concentrates and appears at one position as shown in FIG. 11. Accordingly, when the pixel count for every luminance value is obtained from the image data of the blank-paper detection area to generate the histogram, a dispersion value is computed by averaging difference between the pixel count of each luminance value and the maximum pixel count. And the blank-paper detection determination can be performed on the basis of this dispersion value.

For example, when the total pixel number DATA_NUMBER of the image data used for the blank-paper determination is 70,000,000, and the maximum pixel count H(MAX) of the histogram at the time of computing the pixel count H(n) of each luminance value n is 60,000,000, the dispersion value δ that is an average of the totaled value of the absolute value of the difference of the pixel counts Absolute(H(n)−H(MAX)) is computed by the following formula.

$$\sigma = \frac{\sum_{n=0}^{255} \text{Absolute}(H(n) - H(\text{MAX}))}{\text{DATA\_NUMBER}}$$

$$= \frac{\sum_{n=0}^{255} \text{Absolute}(H(n) - 60,000,000)}{70,000,000}$$

In the above-mentioned formula, since a luminance value of image data is 8 bits and a luminance level is included in a range of 0 through 255, the range of n is defined as 0 through 255. When the dispersion value δ is equal to or more than a predetermined threshold, it is determined that the original is not blank-paper but includes printing information. When the dispersion value δ is less than the predetermined threshold, the original is determined as a blank-paper original.

If a histogram is generated for an imaging range including an outside area of an original area, image data of the white guide member 114 facing the image reading section will be obtained as the image data outside the original area. When the colors of the white guide member 114 and ground of the original 103 differ, since the luminance value of the white guide member 114 differs from the luminance value of the ground of the original, the dispersion value becomes high when the dispersion value of the histogram is computed. In such a case, the blank-paper detection determination cannot be performed correctly because the dispersion value becomes high even for a blank-paper original that does not include printing information. Accordingly, since an original of a regular size enables to determine an original size correctly and to determine a blank-paper detection area correctly inside the area of the original size, the blank-paper-determination result is employed as valid only for an original of a regular size in the embodiment.

According to the process in FIG. 4, when the results of the first determination function and second determination function coincide and the original 103 is determined as a regular size, determine of the blank-paper detection determination circuit 1004 becomes valid, and the blank-paper detection determination result is employed. On the other hand, when the original 103 is determined as an irregular size original, determination of the blank-paper detection determination circuit 1004 becomes invalid, and the blank-paper detection determination result is not employed (step S112). This prevents erroneous determination in blank-paper detection about an irregular size original in which a blank-paper detection area cannot be set correctly. Moreover, erroneous determination in blank-paper detection about an original of an irregular size is prevented, which avoids a disadvantage in that an irregular size original including printing information is not copied or is not saved in a file.

In the embodiment, it is preferable that the determination of the original size is performed before the blank-paper detection determination and that the blank-paper detection determination is not performed when the original 103 is determined as an irregular size original in the determination of the original size. As a result of this, the useless blank-paper detection determination that is not employed is prevented.

The image reading device according to the embodiment constitutes a part of an image forming apparatus including a copying machine, a facsimile machine, etc.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076174, filed Apr. 2, 2014, which is hereby incorporated by reference herein in its entirety.

What is claimed is:

1. An image reading device comprising:
a tray on which an original is placed;
a conveyance path through which the original placed on the tray is conveyed to an image reading portion;
an image reading sensor configured to read image data of the original;
a blank-paper detection determination circuit configured to determine whether the original conveyed through the conveyance path is blank paper;
a processor connected to a memory and configured to execute a determination task to determine whether the original is a regular size or an irregular size; and
a controller configured to control the image reading device, in a case where the blank-paper detection determination circuit determines that the original is blank paper,
so as not to output image data of the original in a case where the processor determines that the original is a regular size, and
so as to output image data of the original in a case where the processor determines that the original is an irregular size.

2. The image reading device according to claim 1, wherein the controller is configured not to employ the detection result of the blank-paper detection determination circuit when the processor determines that the original is an irregular size.

3. The image reading device according to claim 1, wherein the controller is configured to control the image reading device to output the image data of the original in a case where the blank-paper detection determination circuit determines that the original is not blank paper.

4. The image reading device according to claim 1, wherein the determination task includes a first determination task and a second determination task, and wherein the processor is configure to execute:
the first determination task to determine which of predetermined regular sizes corresponds to the original using detection results of a plurality of sensors that are disposed on the tray and the conveyance path; and
the second determination task to determine a width of the original in a direction that intersects perpendicularly with a conveyance direction of the original using image data read from the image reading sensor.

5. The image reading device according to claim 4, wherein the processor is configured to execute the first determination task to determine which of the predetermined regular sizes corresponds to the original using a signal indicating positions of regulating plates that regulate both ends of the original loaded on the tray in the direction that intersects perpendicularly with the conveyance direction, detection results of a plurality of sensors that are disposed on the conveyance path at intervals in the conveyance direction, and detection results of a plurality of sensors that are disposed on the conveyance path at intervals in the direction that intersects perpendicularly with the conveyance direction.

6. The image reading device according to claim 4, wherein the processor is configured to execute the second determination task to determine the width of the original in the direction that intersects perpendicularly with the conveyance direction using a length of a shadow in the direction that intersects perpendicularly with the conveyance direction of a front end of the original detected by the image reading sensor.

7. The image reading device according to claim 4, wherein the processor is configured to determine that the original is a regular size in a case where the determination result of the first determination task and the determination result of the second determination task coincide, and
wherein the processor is configured to determine that the original is an irregular size in a case where the determination result of the first determination task and the determination result of the second determination task do not coincide.

8. The image reading device according to claim 1, wherein the controller is configured to control the blank-paper detection determination circuit not to perform the blank-paper detection in the case where the processor determines that the original is an irregular size.

9. The image reading device according to claim 1, wherein the blank-paper detection determination circuit is configured to determine whether the original is blank paper using a dispersion value of a histogram of the image data in the blank-paper detection area of the original.

10. An image forming apparatus equipped with an image reading device, the image reading device comprising:
a tray on which an original is placed;
a conveyance path through which the original placed on the tray is conveyed to an image reading position;
an image reading sensor configured to read an image data of the original;
a blank-paper detection determination circuit configured to determine whether the original conveyed through the conveyance path is blank paper;
a processor connected to a memory and configured to execute instructions to determine whether the original is a regular size or an irregular size; and
a controller configured to control the image reading device, in a case where the blank-paper detection determination circuit determines that the original is blank paper,
so as not to output image data of the original in a case where the processor determines that the original is a regular size, and
so as to output image data of the original in a case where the processor determines that the original is an irregular size.

* * * * *